April 3, 1962  A. D. NICHOLS  3,028,141
STATOR CONSTRUCTION
Filed March 25, 1957  2 Sheets-Sheet 1
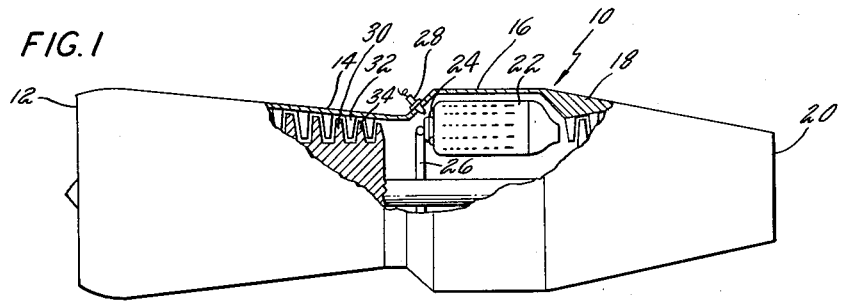
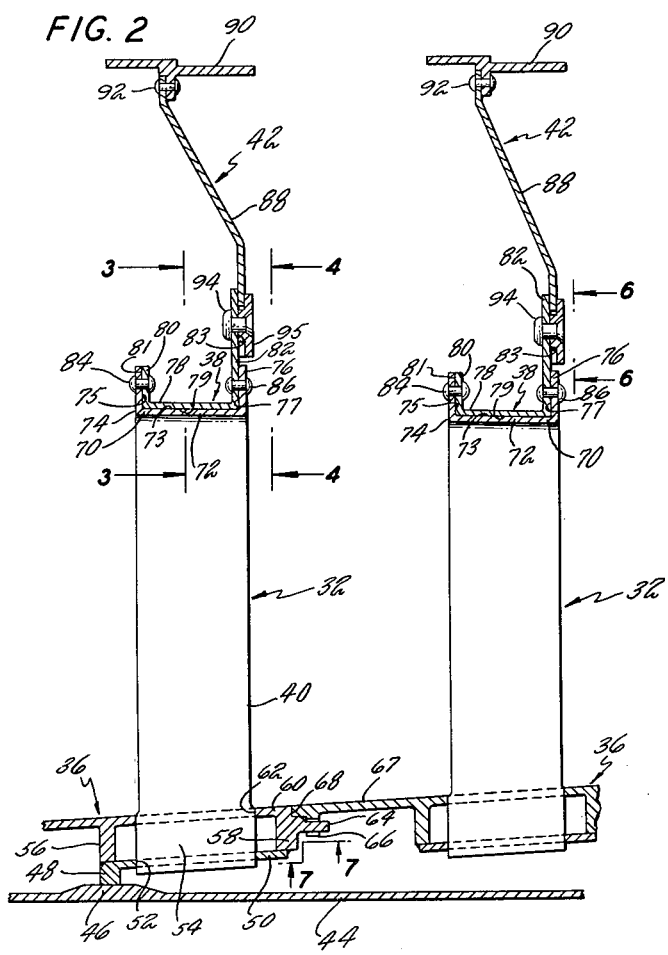
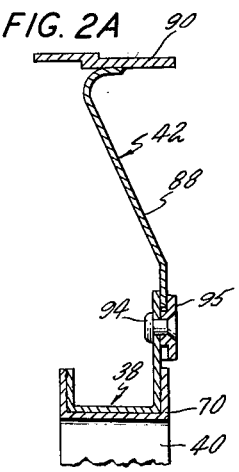
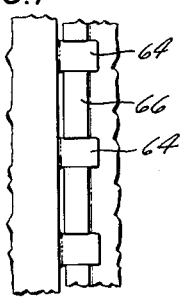
INVENTOR
ARNOLD D. NICHOLS
BY Vernon F. Hauschild
ATTORNEY

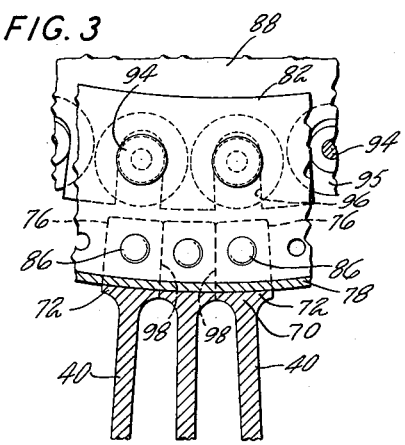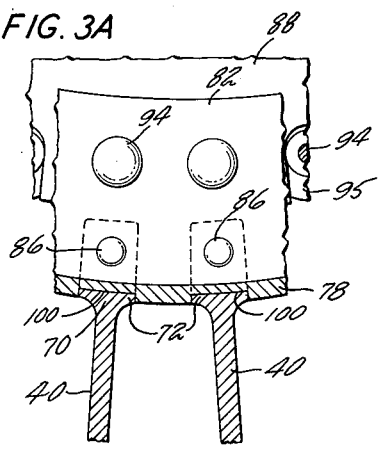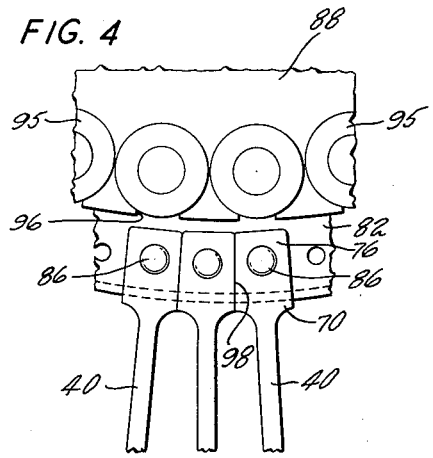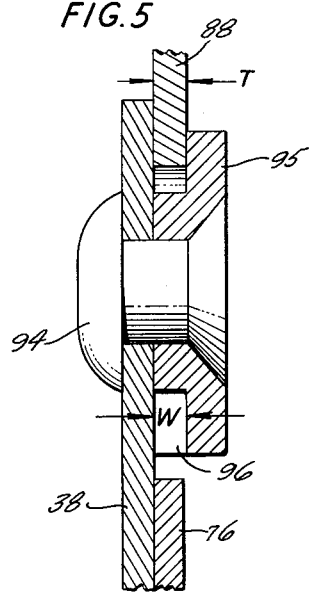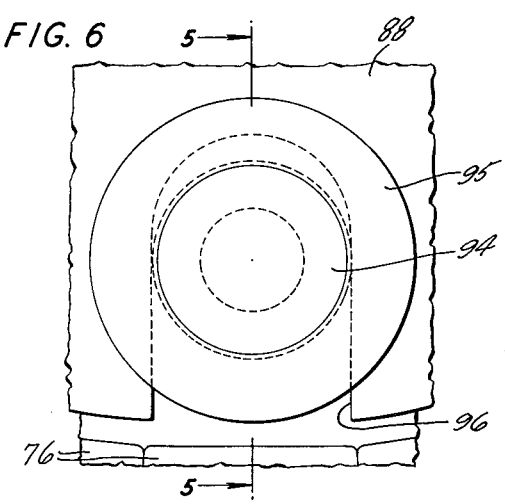
INVENTOR
ARNOLD D. NICHOLS
BY Vernon F. Hauschild
ATTORNEY

United States Patent Office 3,028,141
Patented Apr. 3, 1962

3,028,141
STATOR CONSTRUCTION
Arnold D. Nichols, Newington, Conn., assignor to United Aircraft Corporation, East Hartford, Conn., a corporation of Delaware
Filed Mar. 25, 1957, Ser. No. 648,229
7 Claims. (Cl. 253—78)

This invention relates to turbines and compressors of the type used in modern aircraft jet engines and more particularly to the stator units used between rotors of a compressor or turbine.

It is an object of this invention to provide a stator unit or assembly which is light in weight, rugged in construction, simple to manufacture, capable of thermal expansion during operation and replaceable in whole or in part.

The features and advantages of my invention will be more readily apparent when the detailed description to be given hereinafter is considered in connection with the accompanying drawings in which:

FIG. 1 is a partial cross-sectional view of a modern aircraft turbojet engine.

FIGS. 2 and 2a are partial cross-sectional views of a portion of the engine compressor to illustrate my invention and showing both rivet and fused metal joint attachments.

FIG. 3 is a view taken along line 3—3 of FIG. 2.

FIG. 3a is a modified vane to shroud attachment means.

FIG. 4 is a view taken along line 4—4 of FIG. 2.

FIG. 5 is a view taken along line 5—5 of FIG. 6.

FIG. 6 is a view taken along line 6—6 of FIG. 2.

FIG. 7 is a view taken along line 7—7 of FIG. 2.

Referring to FIG. 1, we see modern aircraft turbojet engine 10 which is given for purposes of illustration to show the position and function, relative to the overall engine, of the turbine or compressor stators to which my invention relates. A turbojet engine was chosen to illustrate the overall embodiment but the invention is equally applicable to any power plant using a turbine or compressor, such as a turboprop power plant. Engine 10 comprises air inlet section 12, compressor section 14, combustion section 16, turbine section 18 and exhaust outlet 20. Air entering engine 10 through air inlet section 12 is compressed as it passes through compressor section 14 and is heated in combustion section 16. Heat is imparted to the gas passing through combustion section 16 from the combustion taking place in the plurality of combustion chambers 22. Atomized fuel is passed into combustion chambers 22 through fuel nozzles 24, which in turn receive fuel from fuel manifold 26. Spark plug or other ignition means 28 performs the function of igniting the atomized fuel discharged into combustion chambers 22 by fuel nozzles 24. The heated gases from combustion section 16 then pass through turbine section 18, during which time the turbine extracts sufficient energy from the gases to drive the compressor and then the engine gases are exhausted to atmosphere through exhaust outlet 20 in a thrust generating function.

For purposes of explanation, my invention will be described as it relates to a compressor but it should be borne in mind that it is equally applicable to a turbine. Compressor section 14 comprises a plurality of rotors, such as 30 and 34, each of which has a plurality of blades projecting radially outward from the periphery of a disc such that both the disc and the plurality of blades rotate about the engine axis during operation. A stator unit or assembly, such as 32, is interposed between alternate rotor stages, such as 30 or 34, and, in part, performs the function of directing the engine gases to the next stage at the proper angle.

My invention relates to stator units, such as 32, and is shown in greater detail in FIG. 2 to which reference will now be made. Stator unit 32 comprises outer shroud 36, inner shroud 38 and a plurality of vanes 40 projecting radially and supported therebetween and interrotor air seal unit 42 which prevents the air from an upstream rotor, such as 30, from passing to a downstream rotor, such as 34, or vice versa, without first passing through stator unit 32.

Stator unit or assembly 32 is positioned and supported radially by case 44 of compressor section 14, which case is circular in cross section and has inwardly directed supporting lip 46 projecting therefrom. Circular flange or lip 48 projects outwardly from outer axially extending ring 50 of outer shroud 36 to engage lip 46 of compressor case 44 to provide the necessary radial support contact. Outer ring 50 has a hole 52 therein which is adapted to snugly receive the tip 54 of vane 40. Outer ring 50 of outer shroud 36 is held, as shown, at both its forward end and its rearward end to both forward radially extending circular flange 56 and rear radially extending circular flange 58 of inner axially extending ring 60 of outer shroud 36. It will be noted that axially spaced circular flanges 56 and 58, which are shown to be an integral part of inner ring 60 of outer shroud 36, but which are not necessarily so limited, serve to coact with radially spaced inner ring 60 and outer ring 50 of outer shroud unit 36 such that an enclosed annulus with radially spaced axially extending walls is formed. Inner ring 60 of outer shroud 36 has hole 62 therein which is adapted to receive tip 54 of vane 40. It will further be noted, as best shown in FIGS. 2 and 7, that relative rotation between adjacent stator assemblies 32 is prevented by so forming alternate outer shrouds 36 that the outer shroud of the forward stator unit has axially extending teeth 64 projecting downstream therefrom which engage, in locking fashion, radially extending teeth 66 of the downstream outer shroud 36. The engagement of teeth 64 and 66 prevents relative rotation between adjacent stator units, such as 32. It will further be noted, as shown in FIG. 2, that axial location and spacing between adjacent stator units 32 are accomplished by providing extended, substantially axially directed lip 67 projecting from the forward end of outer shroud 36 to engage and bear against outer shroud 36 of the next forward stator assembly 32 along radially extending surface 68.

Holes 52 and 62 may be preformed to receive tip 54 of vane 40 or, experience has proved that tip 54 of vane 40 may be punched through both inner ring 60 and outer ring 50 to form holes 52 and 62, thereby insuring a substantially snug fit. Since it is desirable that relative expansion in a radial direction be permitted between stator unit 32 and engine or compressor case 44, this is accomplished by permitting radial movement between vanes 40 and outer shroud 36 by having vane tip 54 of such a fit with respect to holes 52 and 56 that relative movement is permitted therebetween without permitting gas leakage or reducing gas leakage to a minimum.

Vane 40 will probably be of airfoil cross section between tip 54 and foot 70. It will be noted, as best shown in FIG. 2, that the foot 70 of vane 40 is of U-shaped cross section comprising substantially axially extending flange or portion 72 which extends for the full chord dimension of vane 40 and surface 73 and axially spaced inwardly directed radially extending portions 74 and 76 and surfaces 75 and 77 extending from the forward and after ends of axially extending flange or portion 72 or surface 73.

Inner shroud 38 is in the form of a ring, preferably continuous, and of U-shaped cross section and having substantially axially extending ring 78 and surface 79 and inwardly radially extending ring 80 and surface 81 projecting from the forward end of ring 78 and surface 79. Inner shroud 38 also has inwardly directed radially extending ring 82 and surface 83 projecting from the after end of ring 78 and width surface 79 thereof. Foot 70 and inner shroud 38 are of such size that they snugly engage one another such that axially extending portion and ring 72 and 78 and surfaces 73 and 79 are juxtapositioned while radially extending portion and ring 74 and 80 and surfaces 75 and 81 are juxtapositioned as are radially extending portion and ring 76 and 82 and surfaces 83 and 77. It will be noted that the surfaces 73, 75 and 77 of vane foot 70 are juxtapositioned to surfaces 79, 81 and 83 of inner shroud 38 for their full dimension and therefore receive maximum support. Substantial strength is given to inner shroud 38 not only because it is a continuous ring but also because it is of U-shaped cross section and this strength of support is imparted to a vane 40 at inner end or foot 70. Further, the fact that the radially extending surfaces 75—81 and 77—83 engage through a substantial radial dimension, the same strength feature is accomplished as is accomplished by the spaced walls 59 and 60 of outer shroud 36. While FIG. 2 shows that U-shaped foot 70 of vane 40 may be attached to U-shaped inner shroud 38 by rivets, such as 84 and 86, FIG. 2a is included to illustrate that such attachment may be through a fused metal joint, such as by brazing or the like.

Interrotor diaphragm and air seal unit 42 is attached to and supported by inner shroud 38. Diaphragm and seal unit 42 includes substantially radially extending diaphragm 88, which may be made of sheet metal, and rubbing ring, strip or seal 90. Both diaphragm 88 and rubbing ring 90 form a complete ring and the latter is attached to the former either by rivets 92, as shown in FIG. 2, or by a fused metal joint, such as welding, as illustrated in FIG. 2a. Rivets 92 make seal 90 easily replaceable. Sealing ring 90 is positioned a slight distance radially external of rotating knife-edge seal rings (not shown) which rotate with and between rotors, such as 30 and 34, of compressor section 14. Diaphragm and seal unit 42 is connected to inner shroud 38 by rivets 94 which extend through diaphragm 88 and radial flange 82 of inner shroud 38 to join these parts.

To permit relative radial expansion between diaphragm and seal unit 42 and the remainder of the stator assembly 32, in particular inner shroud 38, diaphragm 88 is so constructed that rivets 94 pass through a plurality of radially extending and outwardly opening slots 96 (see FIGS. 5 and 6) instead of the conventional circular hole and engages spacer 95. Dimension "w" of spacer 95 is made slightly larger than dimenstion "t" of diaphragm 88 so that relative radial motion between diaphragm 88 and inner shroud 38 is permitted due to this slight clearance and the shape of slots 96. In view of the fact that there are a plurality of rivets 94 engaging the outer periphery of diaphragm 88 and spacers 95 through slots 96, rivets 94 serve to circumferentially, axially and radially position diaphragm 88 but the shape of slot 96 and the thickness of spacer 95 permits relative radial motion between diaphragm 88 and inner shroud 38.

By viewing FIGS. 3 and 4, we see that the radially extending portions, flanges or lugs 74 and 76 of vane foot 70 may be adapted so as to abut one another along surface 98 and in this fashion circumferentially position and space vane inner ends or feet 70 and simplify fabrication. Obviously, the width of portions, flanges or lugs 76 must vary depending upon the desired circumferential spacing of vanes 40. Further, it will be obvious to those skilled in the art that vanes 40 could be properly positioned without the abutting feature between lugs 76 but such might require relatively elaborate fixtures and, further, spacer pieces could be used between vane feet 70 to perform this spacing function. To avoid spacer pieces, radially inwardly directed and axially extending grooves such as 100 (see FIG. 3a) may be used in ring 78 of inner shroud 38 to receive portions 72 of foot 70. The width of groove 100 and portion 72 should be such to insure a snug fit and rivets, such as 84 and 86, or a fused metal joint may be the attachment means.

Experience has shown that seal ring 90, diaphragm 88 and inner shroud 38 may be either cast or forged and then machined to proper size or may be fabricated from sheet metal. Foot 70 or vane 40 may be either cast or forged and then machined to final size.

By way of explanation of the assembly of stator unit 32, the plurality of vanes 40 are passed through preformed holes 62 and 52 in outer shroud 36 or are punched through outer shroud 36 to form holes 52 and 62. Vanes 40 are then forced radially outward through these holes beyond their normal positions. Inlet shroud ring 38 is then placed centrally within the plurality of vanes 40 and the vanes 40 are driven radially inward to snugly engage inner shroud 38 as shown in FIG. 2. The inner foot 70 may then either be brazed in a typical brazing furnace or joined by any type of a fused metal joint to inner shroud 38 or riveted thereto, both of which are illustrated in FIGS. 2 and 2a. Diaphragm and air seal unit 42 is then attached to radial flange 82 of inner shroud 38 to complete the fabrication of stator unit 32.

As described previously, rivets 92 permit easy replacement of seal ring 90 and rivets 84 and 86 permit easy replacement of diaphragm and seal unit 42.

It is to be understood that the invention is not limited to the specific embodiment herein illustrated and described, but may be used in other ways without departure from its spirit as defined by the following claims.

I claim:

1. In a stator assembly, an outer shroud presenting two radially spaced, axially extending rings with aligned holes therein, an inner shroud comprising a ring of U-shaped cross section, a plurality of circumferentially spaced vanes extending radially between said inner and outer shrouds each having a tip which passes through said holes in sealing relation thereto and is movable radially with respect thereto to axially and circumferentially position said vane tip with respect to said outer shroud and also having a foot of U-shaped cross section of such size as to snugly engage said U-shaped inner shroud throughout all surfaces of the U of said U-shaped foot, and means to attach said vane foot to said inner shroud.

2. In a stator assembly, an outer shroud presenting two radially spaced, axially extending rings with aligned holes therein, an inner shroud comprising a ring of U-shaped cross section, a plurality of circumferentially spaced vanes extending radially between said inner and outer shrouds each having a tip which passes through said holes in sealing relation thereto and is movable radially with respect thereto to axially and circumferentially position said vane tip with respect to said outer shroud and also having a foot of U-shaped cross section of such size as to snugly engage said U-shaped inner shroud throughout all surfaces of the U of said U-shaped foot, means to attach said vane foot to said inner shroud, a substantially radial diaphragm projecting inwardly from said inner shroud and having outwardly opening radially extending grooves in the outer periphery thereof, means to attach said diaphragm to said inner shroud and passing thru said grooves such that relative radial motion may occur between said inner shroud and diaphragm, and a replaceable seal ring detachably connected to the inner periphery of said diaphragm.

3. In a stator assembly, an outer shroud presenting two radially spaced, axially extending rings with aligned holes therein, an inner shroud comprising a ring of U-shaped cross section and having an axially extending surface and two radial surfaces each projecting inwardly from the ends of said axially extending surface, a plurality of circumferentially spaced vanes extending radially between said inner and outer shrouds each having a tip which passes through said holes in sealing relation thereto and is movable radially with respect thereto to axially and circumferentially position said vane tip with respect to said outer shroud and also having a foot of U-shaped cross section and having an axially extending surface and two radial surfaces each projecting inwardly from the ends of said axially extending surface of such size as to snugly engage said U-shaped inner shroud such that said axially extending surfaces and the corresponding radially extending surfaces of said inner shroud and said vane foot are juxtapositioned, means to attach said vane foot to said inner shroud, a substantially radial diaphragm projecting inwardly from said inner shroud and having outwardly opening radially extending grooves in the outer periphery thereof, means to attach said diaphragm to said inner shroud and passing thru said grooves such that relative radial motion may occur between said inner shroud and diaphragm, and a replaceable seal ring detachably connected to the inner periphery of said diaphragm.

4. In a stator assembly an outer shroud presenting two radially spaced, axially extending rings with aligned holes therein, one of said rings having greater axial dimension than the other to serve as a spacer for an adjacent stator assembly, an inner shroud comprising a ring of U-shaped cross section and having an axially extending surface and two radial surfaces each projecting inwardly from the ends of said axially extending surface, a plurality of circumferentially spaced vanes extending radially between said inner and outer shrouds each having a tip which passes through said holes in sealing relation thereto and is movable radially with respect thereto to axially and circumferentially position said vane tip with respect to said outer shroud and also having a foot of U-shaped cross section and having an axially extending surface and two radial surfaces each projecting inwardly from the ends of said axially extending surface of such size as to snugly engage said U-shaped inner shroud such that said axially extending surfaces and the corresponding radially extending surfaces of said inner shroud and said vane foot are juxtapositioned, means to attach said vane foot to said inner shroud, a substantially radial diaphragm projecting inwardly from said inner shroud and having outwardly opening radially extending grooves in the outer periphery thereof, means to attach said diaphragm to said inner shroud and passing through said grooves including spacer means of slightly greater dimension than the thickness of said diaphragm such that relative radial motion may occur between said inner shroud and diaphragm, and a seal ring connected to the inner periphery of said diaphragm.

5. In a stator assembly, an outer shroud presenting two radially spaced, axially extending rings with aligned holes therein, an inner shroud comprising a ring of U-shaped cross section, a plurality of circumferentially spaced vanes extending radially between said inner and outer shrouds each having a tip or outer end which passes through said holes in sealing relation thereto and is movable radially with respect thereto to axially and circumferentially position said vane tip with respect to said outer shroud and also having a foot or inner end of U-shaped cross section of such size as to snugly engage said U-shaped inner shroud throughout all surfaces of the U of said U-shaped foot and of such width as to abut the feet of adjacent vanes to circumferentially position and space the inner ends of said vanes, and rivet means to attach said vane foot to said inner shroud.

6. In a stator assembly, an outer shroud presenting two radially spaced, axially extending rings with aligned holes therein, an inner shroud comprising a ring of U-shaped cross section, a plurality of circumferentially spaced vanes extending radially between said inner and outer shrouds each having a tip or outer end which passes through said holes in sealing relation thereto and is movable radially with respect thereto to axially and circumferentially position said vane tip with respect to said outer shroud and also having a foot or inner end of U-shaped cross section of such size as to snugly engage said U-shaped inner shroud throughout all surfaces of the U of said U-shaped foot and of such width as to abut the feet of adjacent vanes to circumferentially position and space the inner ends of said vanes, said vane foot connected to said inner shroud by a fused metal joint.

7. In a stator assembly concentric about an axis, a first vane support shroud including at least one axially extending vane end retaining member defining at least one axially extending vane end retaining hole, a second vane support shroud comprising a ring of U-shaped cross section, a plurality of circumferentially spaced vanes extending radially between said first and second shrouds each having a first end which passes through said hole in sealing relation thereto and is movable radially with respect thereto to axially and circumferentially position said vane first end with respect to said first shroud and also having a second end of U-shaped cross section of such size as to snugly engage said U-shaped second shroud throughout all surfaces of the U of said U-shaped foot, and means to attach said vane foot to said second shroud.

References Cited in the file of this patent
UNITED STATES PATENTS

| | | |
|---|---|---|
| 1,998,951 | Downer | Apr. 23, 1935 |
| 2,427,244 | Wainer | Sept. 9, 1947 |
| 2,628,067 | Lombard | Feb. 10, 1953 |
| 2,640,319 | Wislicenus | June 2, 1953 |
| 2,749,026 | Hasbrouck et al. | June 5, 1956 |
| 2,772,069 | Hockert et al. | Nov. 27, 1956 |

FOREIGN PATENTS

| | | |
|---|---|---|
| 25,690 | Great Britain | Apr. 4, 1907 |
| 470,214 | Canada | Dec. 19, 1950 |